(No Model.)

J. NABER, Jr.
EAR FOR VESSELS.

No. 453,788.  Patented June 9, 1891.

Witnesses
Isaac Behrends.
H. J. Riley

Inventor
Joseph Naber Jr.
By his Attorneys,
C. A. Snow & Co.

UNITED STATES PATENT OFFICE.

JOSEPH NABER, JR., OF COLLINS, NEW YORK.

EAR FOR VESSELS.

SPECIFICATION forming part of Letters Patent No. 453,788, dated June 9, 1891.

Application filed February 10, 1891. Serial No. 380,942. (No model.)

*To all whom it may concern:*

Be it known that I, JOSEPH NABER, Jr., a citizen of the United States, residing at Collins, in the county of Erie and State of New York, have invented a new and useful Ear for Vessels, of which the following is a specification.

The invention relates to improvements in ears for vessels.

The object of the present invention is to provide a simple and inexpensive ear adapted to hold a bail and prevent the same resting on the vessel and becoming heated and to maintain the bail in convenient positions to be readily grasped.

The invention consists in the construction and novel combination and arrangement of parts hereinafter fully described, illustrated in the accompanying drawings, and pointed out into the claims hereto appended.

Figure 1:
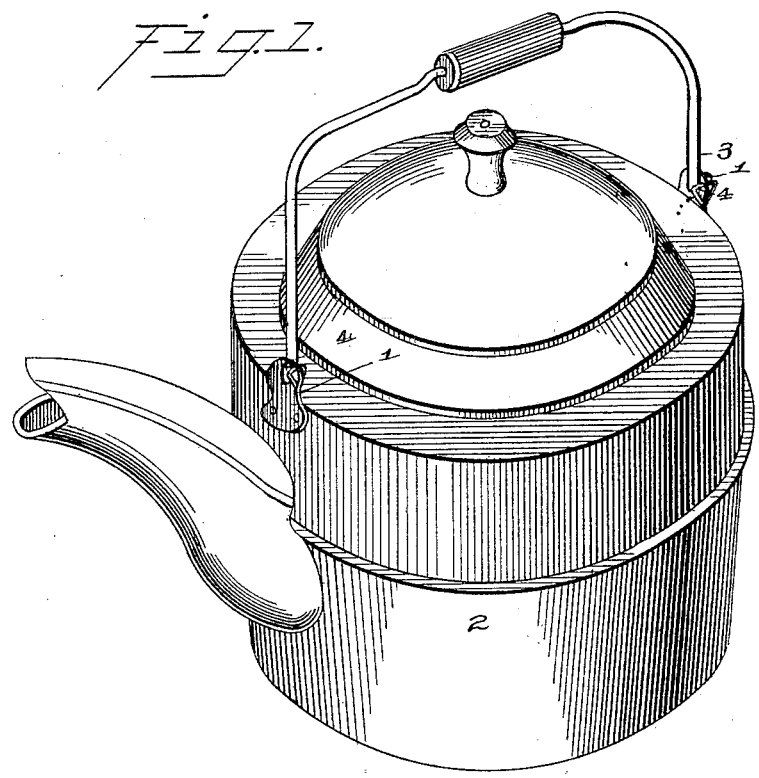
Figure 3:
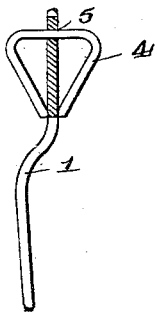
Figure 2:
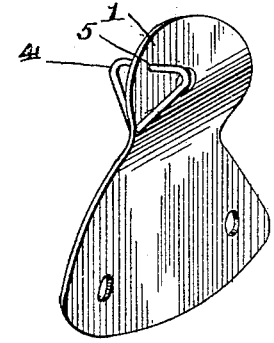

In the drawings, Figure 1 is a perspective view of a vessel provided with an ear constructed in accordance with this invention. Fig. 2 is a perspective view of the ear detached. Fig. 3 is a sectional view.

Referring to the accompanying drawings, 1 designates an ear secured to a vessel 2 by rivets or the like and having hinged to it in the usual manner a bail 3, which is adapted to engage a projection 4 and to be held by the same in a vertical position to prevent being heated by contact with the vessel 2 and to be in convenient position to be readily grasped.

The invention is especially applicable to tea-kettles and other vessels in which liquids are heated and when it is desirable to keep the bail out of contact with the body of the vessel. The projection 4 is formed by a triangular piece of wire centrally arranged in a perforation 5 of the ear, and arranged on opposite sides of the same and secured to the opposite faces thereof by soldering or the like. Projections may be arranged on opposite sides of the bail, or on only one side, as illustrated in the accompanying drawings, and the angle at which the bail is held may be varied as desired. The wire extends through the ear and forms stops on the inner and outer faces of the ear, the one on the inside to engage the bail and the one on the outside to engage the upturned end of the bail.

It will readily be seen that the device is simple and inexpensive in construction and adapted to hold the bail in an upright position and prevent the same coming in contact with the vessel.

What I claim is—

1. An ear for vessels provided with a wire passing through the ear and forming stops on the inner and outer faces of the ear to engage the bail and its upturned end, substantially as described.

2. An ear for vessels having an opening and provided with the triangular wire arranged in the opening and extending on opposite sides of the ear and forming projections, and having its ends secured to the faces of the ear, substantially as described.

In testimony that I claim the foregoing as my own I have hereto affixed my signature in presence of two witnesses.

JOSEPH NABER, JR.

Witnesses:
JOHN C. WILBER,
O. D. SPRAGUE.